(12) United States Patent
Watts

(10) Patent No.: US 6,394,034 B2
(45) Date of Patent: *May 28, 2002

(54) ANIMAL CAGE GUARDS

(76) Inventor: Patricia Watts, 655 S. Velare St., #6, Anaheim, CA (US) 92804

( * ) Notice: Subject to any disclaimer, the term of this patent is extended or adjusted under 35 U.S.C. 154(b) by 0 days.

This patent is subject to a terminal disclaimer.

(21) Appl. No.: 09/902,204

(22) Filed: Jul. 10, 2001

Related U.S. Application Data

(62) Division of application No. 09/390,914, filed on Sep. 7, 1999, now Pat. No. 6,269,775.

(51) Int. Cl.[7] ............................................... A01K 31/06
(52) U.S. Cl. ...................... 119/469; 119/470; 119/467
(58) Field of Search ................................. 119/416, 467, 119/469, 470; D30/108–120

(56) References Cited

U.S. PATENT DOCUMENTS

| | | | |
|---|---|---|---|
| 260,768 A | * | 7/1882 | Maxheimer ................. 119/469 |
| 1,094,423 A | | 4/1914 | Brandt |
| 1,154,384 A | | 9/1915 | Crucet |
| 1,186,782 A | | 5/1916 | Hercer |
| 1,539,583 A | | 5/1925 | Lindemann |
| D70,073 S | | 5/1926 | Hendryx |
| D73,090 S | | 7/1927 | Leon |
| 1,680,184 A | | 8/1928 | Viewegh |
| 1,794,718 A | | 3/1931 | Little |
| 2,002,925 A | | 5/1935 | Robison |
| 2,028,612 A | | 1/1936 | Kosvich |
| 2,045,472 A | | 6/1936 | Kearney et al. |
| D115,695 S | | 7/1939 | Steinberg |
| 2,178,117 A | | 10/1939 | Hillenek |
| 2,240,631 A | | 5/1941 | Stewart |
| 4,991,544 A | | 2/1991 | Galvin et al. |
| 5,088,445 A | | 2/1992 | Brindamour |
| 5,201,278 A | | 4/1993 | Hehn |
| D428,536 S | | 7/2000 | Watts |
| 6,269,775 B1 | * | 8/2001 | Watts ......................... 119/469 |

OTHER PUBLICATIONS

Package Birdie Bloomer.
Advertisement Birdcage Barrier.

* cited by examiner

*Primary Examiner*—Charles T. Jordan
*Assistant Examiner*—Judith A. Nelson
(74) *Attorney, Agent, or Firm*—Knobbe, Martens, Olson & Bear, LLP

(57) ABSTRACT

A cage guard which is adaptable to a variety of cage shapes and types is described in the present invention. The cage guard is a flexible form composed of a nonporous bottom portion, an optional nonporous side portion, a porous side portion, and band to secure the cage guard to a cage. The cage guard is produced in such a way that it conforms to the cage. This gives the cage guard the advantageous property of keeping debris and excretions inside the cage so the animal can be enjoyed in a clean, sanitary way.

4 Claims, 4 Drawing Sheets

ANIMAL CAGE GUARDS

RELATED APPLICATION

The present application is a divisional filing of application Ser. No. 09/390,914, filed on Sep. 7, 1999 now issued as U.S. Pat. No. 6,269,775, the entirety of which is incorporated herein by reference.

FIELD OF THE INVENTION

The present invention relates generally to animal cage guards. More specifically, the invention relates to a simple, easy to use cage guard which conforms to the bottom and lower side portions of a cage to keep refuse in the cage while permitting relatively unobstructed viewing of the upper portions of the cage.

BACKGROUND OF THE INVENTION

Pet cages are typically a wire or barred cage with a floor. The wires or bars making up the sides of the cage are generally uncovered, because an unobstructed view of the animal is preferred. Although this type of design is advantageous for viewing the pet, it often leads to spillage of debris, food, and even unsanitary animal waste, as these substances are likely to pass through the bars or wires making up the sides of the cage. This creates a continuing duty on the part of the pet owner to clean the floors or walls of the area of the home where the cage is placed.

One proposed prior art solution to this problem in the context of bird cages appears in U.S. Pat. No. 1,094,423 to Brandt, which generally teaches a fabric netting structure which attaches to a bird cage by a hook or the like, and which hangs loosely under the cage. Litter expelled from the cage is meant to be caught by the fabric underhanging the cage. This type of cage attachment has the disadvantage of being difficult to remove, difficult to clean, and is prone to accidental spillage. The accidental spillage can occur during cleaning, or debris might escape from the sides of the cage, missing the hanging attachment.

Another proposed solution has been a rectangular attachment which wraps around or envelops the sides of a cage, and is held in place by Velcro or elastic. This design fails to fully solve the problem of debris being ejected from the cage and into the home environment, however, as there is a gap between the bottom and side of the cage allowing for leakage of debris, particularly liquids.

Accordingly, there exists a need for an improved cage guard which minimizes or prevents unwanted matter from being dispelled from a pet cage.

SUMMARY OF THE INVENTION

The present invention solves the problems noted above by providing a cage guard which is durable, easy to use, and which conforms to both the lower sides and bottom of a pet cage.

In one embodiment, the cage guard of the present invention comprises a flexible relatively nonporous bottom designed to conform and snugly fit the bottom of a pet cage. The bottom is attached or integrally formed with a flexible relatively nonporous lower side, which is adapted to conform and snugly fit to the lower sides of a pet cage. The relatively nonporous lower side is in turn attached or integrally formed with a relatively porous upper side which covers a portion of the sides of the cage above those covered by the relatively nonporous lower side.

This design has the advantage of keeping debris from being ejected from lower portions of the cage or slipping through gaps to spill into the home environment. The nonporous lower side advantageously keeps very small particles, fluids and excretions within the cage. The relatively porous upper side permits easy viewing while keeping larger flying particles within the cage. The cage guard is secured to the cage by an elastomeric band attached to the porous upper side. The elastomeric band may extend along the entirety of the circumference of the porous upper side, or along less than the entirety provided that elastomeric band provides sufficient force radially inward to hold the cage guard in place.

In another embodiment of the present invention, there is provided an animal cage guard which is composed of a flexible nonporous bottom attached directly to porous sides. The porous sides are provided with an elastomeric band along an at least an upper portion of the circumference of the porous sides to secure the cage guard to an animal cage. The bottom and porous sides are dimensioned such that they are capable of conforming to the shape of the lower portion of the cage. Consequently, this embodiment eliminates the nonporous lower side discussed above.

Preferably, the materials used to manufacture the cage guard are machine washable. Moreover, in some embodiments, it may be desirable to waterproof the nonporous portions, particularly when used with animals likely to expel fluids from lower portions of the cage.

The bottom is preferably constructed of a medium to heavy-weight fabric or fabric-like material, such as polycotton, burlap, polyester, polyester blends, trigger poplin, nylon, vinyl, and Gore-tex™. The nonporous lower side is preferably constructed of the same material as the bottom. The porous side is preferably constructed of a weaved material. For example, the porous side may be constructed of mesh netting, nylon tulle, or an elastic mesh. It is preferred that the porous side have a mesh gauge having apertures smaller than the largest particle which might be ejected from the cage. Depending upon the type of animal kept, the present inventor has found gauge of about 0.1 mm through 3 mm adequate, with 0.2–1 mm being preferred for birds.

The elastomeric band used to secure the cage guard to the cage may take the form of an elastic band, a rubber band, or similar elastomeric structure known to those of skill in the art. Alternately, the elastomeric band may be eliminated where the porous upper sides are formed of elastomeric materials.

In its preferred embodiment, the cage guard of the present invention is used with a bird cage. This is because birds tend to reside in the upper portions of their cages, and consequently, the nonporous side will not interfere with most of the viewing of the birds.

DETAILED DESCRIPTION OF THE PREFERRED EMBODIMENTS

The animal cage guard of the present invention is a simple to use barrier which can be fitted to a variety of pet cages for the purpose of catching and holding debris or spillage from lower portions of the cage where such spillage is most likely. Furthermore, the cage guard of the present invention is easy to remove and clean. It conforms to the cage sides and bottom and therefore minimizes or eliminates gaps through which debris might otherwise slip through. This allows the owner to enjoy the pet without the mess and unsanitary conditions that might otherwise occur. In addition, the invention is simple and durable, and can be manufactured and sold at a reasonable cost. Although described in connection with square cage designs, it should be understood that the invention is not so limited, as it is easily adaptable to other shapes as well as sizes of cages. For example, the cage guard of the present invention may be used with cages having oval, triangular, pentagonal, hexagonal, or other geometrical cross-sectional configurations. The manner of adapting the present invention to the other embodiments will become apparent to those of skill in the art in view of the teachings herein.

Furthermore, the cage guard of the present invention can be used for any animal cage which might have the problem of spillage from the lower sides. It is particularly advantageous for a bird cage, and particularly a hanging bird cage or a bird cage which rests on a surface. However, the cage guard can be used for a rodent, reptile, rabbit, or any other type of animal cage.

Figure 1:
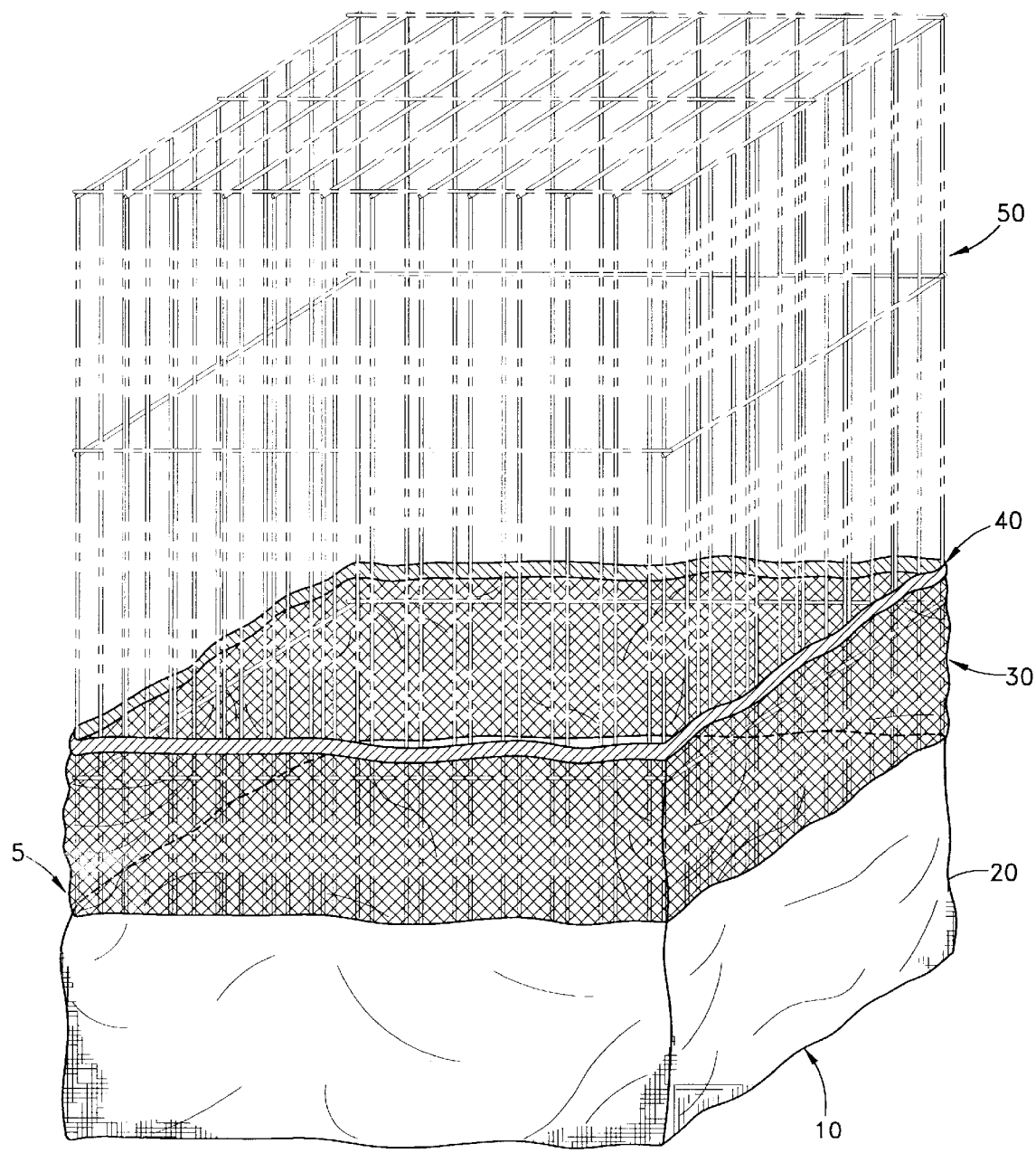
FIG. 1 is a perspective view showing an animal cage employing the animal cage guard of the present invention on a cage having a square cross-sectional shape.
Figure 2:
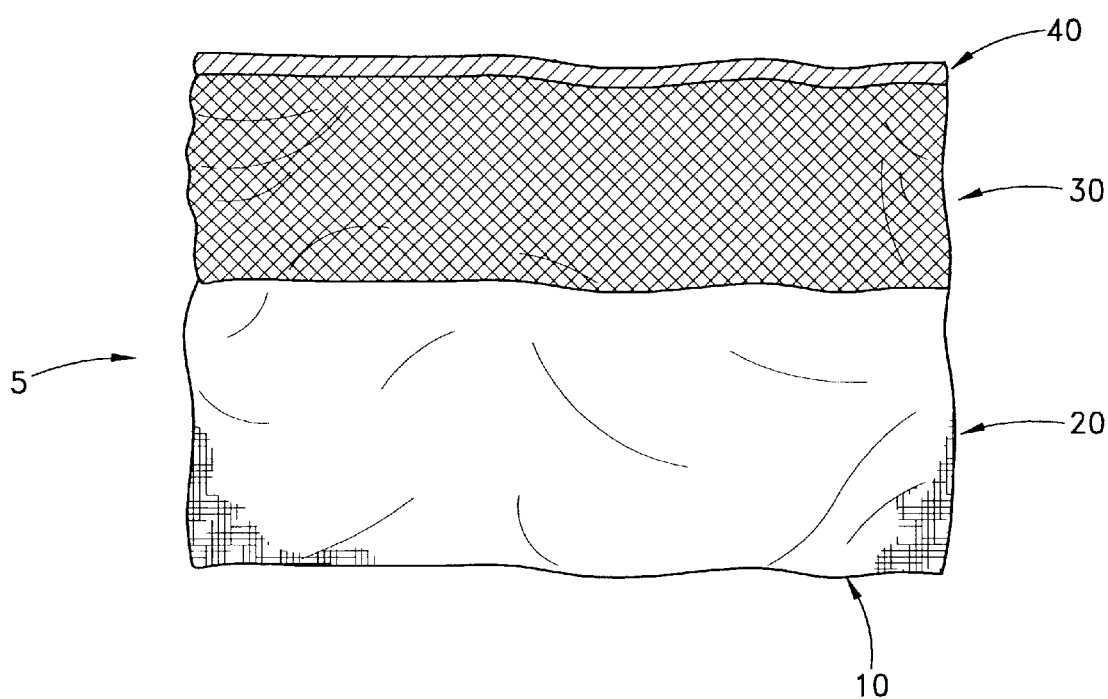
FIG. 2 is a side view showing the animal cage guard of FIG. 1.
Figure 3:
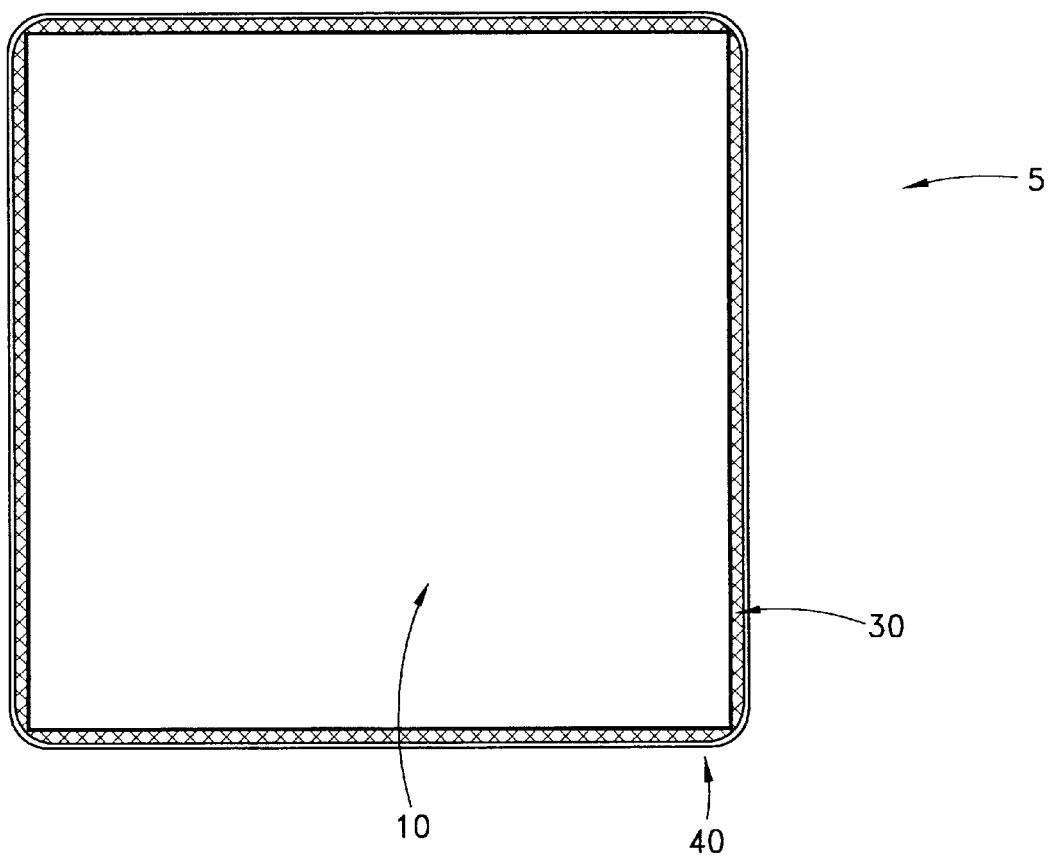
FIG. 3 is a top view of the animal cage guard of FIG. 1.
Figure 4:
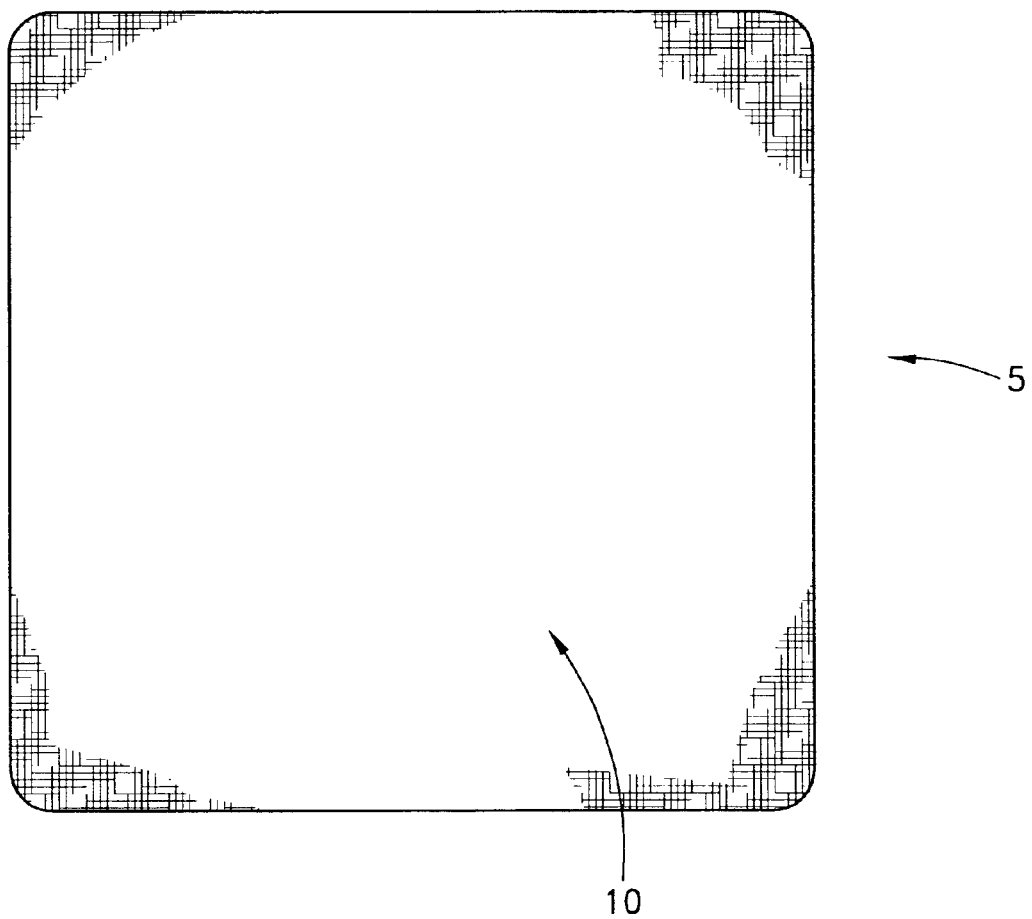
FIG. 4 is a bottom view of the animal cage guard of FIG. 1.

An embodiment of cage guard 5 of the present invention is illustrated in FIGS. 1–4. Referring to FIG. 1, cage guard 5 is shown fitted over cage 50. Cage 50 may be any conventional wire or barred cage as known to those of skill in the art. As shown in FIG. 1, cage 50 has a square cross-sectional shape, and thus a square bottom. The sides and bottom of cage guard 5 conform to the lower outer dimensions of cage 50, and particularly the bottom and lower sides of cage 50, and thus have a square or cross-sectional shape, as shown in FIGS. 1–4. By conform, it is meant that the inner surfaces of cage guard 5 substantially fit to and contact the outer bottom and lower side surfaces of cage 50. In use, cage guard 5 is slipped over the bottom and sides of the cage 50, and is held in place by means of elastomeric band 40, as shown in FIG. 1.

Cage guard 5 generally comprises a bottom 10, a lower side 20, a porous upper side 30, and an elastomeric band 40 to secure cage guard 5 to the cage. As shown in FIG. 1, cage guard 5 functions to keep food and debris in the cage and to keep liquid and secretions inside the cage, because the lower side 20 is relatively nonporous, and prevents liquids and very small particles from being expelled, while the porous upper side 30 functions to deflect larger size refuse back into the lower portion of the cage, or into a "waste receptacle" defined by the sides and bottom portion 10. Advantageously, the home or room in which the pet is kept will be free of debris and waste which would otherwise be expelled from the cage.

Referring to FIGS. 1–4, flexible bottom 10 is a particularly advantageous part of the present invention because it conforms to the cage and keeps debris from falling to the floor. The term flexible is used to mean that the material chosen for the bottom 10 is capable of conforming to the bottom of the selected cage. Bottom 10 is also preferably nonporous. The term nonporous is used to mean that the material used for bottom 10 does not have large openings or pores through which animal debris may pass. Bottom 10 may be constructed of materials which permit diffusion of gases through bottom 10, such as air. Bottom 10 may also be constructed of materials that will pass liquids, although in most embodiments of the present invention, it is preferred that bottom 10 prevent or minimize liquid flow therethrough and thus be waterproofed.

In a preferred embodiment, bottom 10 is selected in view of the type of refuse which a particular animal might expel from the bottom side portions of a cage. For example, birds tend to eject droppings and water from the bottom portions of their cages, and portion 10 is selected to prevent such refuse from being expelled. Particularly suitable materials for construction of bottom 10 include medium to heavy fabrics, either natural or synthetic. Such a fabric may include polycotton, burlap, polyester, polyester blends, trigger poplin, nylon, vinyl, denim, spandex, and waterproof materials such as GORETEX™, as well as other similar materials known to those of skill in the art.

In some embodiments, it may be desirable to construct bottom 10 of waterproof materials. This embodiment is particularly advantageous where it is expected that water or other fluids may be expelled from the cage. When bottom 10 is constructed of waterproof materials and cage guard 5 is fitted over the cage, expelled liquids will be trapped within the region defined by the interior of bottom 10 and lower side 20, which function as a waterproof waste receptacle. Bottom 10 may be waterproofed in a variety of ways. For example, bottom 10 may be treated chemically to waterproof it, or it may be constructed of waterproof materials. This may include the addition of a second layer of waterproof material lining bottom 10 and lower side 20. Waterproof materials may include flexible plastics and other synthetics, as known to those of skill in the art.

In the embodiment shown in FIGS. 1–4, bottom 10 is attached to or integrally formed with lower side 20. In a preferred embodiment, side portion 20 is relatively nonporous, and is preferably constructed of materials similar to those used for bottom 10. Side 20 may also be constructed of translucent materials, such as plastics, to permit easier viewing of the lower portions of the cage. In some embodiments, it may also be desirable to construct bottom 10 out of different materials than lower side 20.

Bottom 10 is preferably be attached to nonporous lower side 20 in such a way that there is no gap therebetween. Such attachment may comprise sewing, fusing, or adhesively bonding the portions together, or other attachment means known to those of skill in the art.

As is shown in FIGS. 1–4, porous upper side 30 is attached to lower side 20. Such attachment can be by any means known to those of skill in the art, and particularly those noted above. Porous side 30 of the present invention offers the ability to view the animal without obstruction which might be created by the nonporous sides if the nonporous sides are constructed of opaque materials. Porous side 30 also permits air to freely flow therethrough, for the enjoyment and health of the animal. Porous side 32 may have a variety of gauges. Gauge refers to the spaces or pores between the fibers of the mesh. The mesh is preferably a small enough gauge that excretions will be contained within the cage or it can be of a large mesh to allow for better viewing. Porous side 30 can be chosen in a variety of tightness of weave or gap such that it will keep different sized flying debris, or even excretions in the cage without obstructing the view. In one embodiment, porous side 30 is made up of a large weave fabric or net, having openings of from about 2 mm–3 mm. This size of opening would be sufficient to keep most cage debris from being ejected from the cage, such as a bird cage, but will not prevent liquids from being expelled. Porous side 30 is preferably made up of a material such as nylon mesh net or nylon tulle which is stiff yet flexible enough to fit to the sides of the cage. In some embodiments, porous side 30 may be constructed of elastomeric materials which secure cage guard 5 to the cage without need for band 40.

In one preferred embodiment the gauge of the porous side 30 is smaller than the smallest solid particle that may likely exit the cage at the particular point where the gauge is positioned. Thus, for example, if an animal tends to expel larger size refuse from upper portions of the cage and smaller size refuse from lower portions, the gauge of the lower portions may be selected to be smaller than that of the upper portions. Advantageously, the larger gauge of the upper portions facilitates viewing of the animal. Preferably, the porous side 30 is made of a material which is machine washable to allow for easy clean-up.

Porous side portion 30 may have an elastomeric band 40 along a portion of the circumference of the porous side 30 or along the entire circumference. Band 40 secures cage guard 5 to cage 50. Furthermore, band 40 is preferably selected to allow for easy removal and mounting of the cage guard, and to permit the side portions 20 and 30 to conform closely to the cage without gaps.

Band 40 may be made of any substance that allows for the above conditions. One class of materials found suitable are elastomeric materials. These may include an elastic band, a rubber band, or spandex. Alternatively, separate band 40 may be eliminated if porous side 30 are made of a stretchable material which can, in and of itself, conform to the cage and hold the cage guard in place.

In an alternate embodiment, lower side 20 is eliminated, and bottom 10 is attached directly to porous upper side 30, such that the lower sides of the cage are encompassed within conforming porous upper side 30. In this embodiment, porous side 30 may have lower regions of small gauge, as for example 2–3 inches along the bottom of a cage, and open regions with larger gauge. This embodiment is advantageous for pet cages housing pets which spend most of their time in lower portions of the cage, such as rodents, because the porous side 30 permits easier viewing of the pet.

One unique advantage of the cage guard of the present invention is its ability to conform to the lower portions of the pet cage. As described above, this is accomplished by choosing materials which are flexible enough to be pulled over the cage, and by dimensioning the cage guard so that its cross-sectional shape and area are within a range sufficient to permit the cage guard to conform. For example, if a cage has a square cross-sectional shape with sides of 12 inches, bottom 10 preferably has a square cross-sectional shape, and sides of slightly larger than 12 inches. The height of sides 20 and 30 can be varied as needed to accommodate the animal kept. For birds, it is preferred that side 20 have a height of 2–5 inches, and side 30 a height of 5–10 inches, although these are not limiting values and can be varied as desired to optimize viewing enjoyment and still prevent waste expulsion. Where elastomeric band 40 is used, it is preferred that it have an unstretched circumference slightly smaller than the circumference of the cage, and stretched circumference larger than the circumference of the cage, so that a radial inward force is generated when the cage guard 5 is fixed on a cage, to hold the cage guard in place.

Alternatively, the cage guard of the present invention may be of a different cross-sectional shape or larger area, but still conform to the cage by means of fasteners which can be adjusted to conform the cage guard to the cage. In one embodiment these additional fasteners can be velcro fasteners, positioned at points along the sides of the cage guard to eliminate slack. For example, Velcro hooks can be provided near the edges of the lower sides on upper sides, with the mating Velcro piece attached to the adjacent side near the edge, such that the two mating Velcro pieces can be secured to remove slack from the cage guard. Hooks, buttons, snap fasteners and the like might also be used in place of Velcro. These fasteners can be incorporated into various points of sides 20 and 30 to allow for tightening the sides 20 and 30 to the cage at the corners or elsewhere.

The cage guard of the present invention can be constructed in such a way that it is inexpensive to produce yet durable. It can also be constructed in such a way that it is machine washable and thus easy to clean and keep sanitary. Lastly, it can be constructed in such a way that it will keep debris and excretions from exiting the cage and depositing on walls, floors, and furniture thus allowing the user to enjoy the animal without undue or unsanitary discomfort.

From the foregoing description, additional advantages and novel features or alternatives will be apparent to one of skill in the art.

It should be understood that changes may be made in the construction and in the combination and arrangement of the several parts, provided that such changes fall within the scope of the appended claims.

What is claimed is:

1. An animal cage guard, comprising:

a nonporous bottom;

a lower side portion attached to the nonporous bottom;

an upper side portion attached to the lower side portion, the upper side portion being more porous than the lower side portion;

attachment means for securing the cage guard to an animal cage.

2. The animal cage guard of claim 1, further comprising fastening means for conforming the cage guard to the animal cage.

3. A cage guard to fit around a cage, comprising:

a bottom;

a lower side portion having an expanded cross-sectional shape approximately the cross-sectional shape of the cage, the lower side portion being attached to the bottom;

an upper side portion attached to the lower side portion, the upper side portion having an expanded cross-sectional shape approximating the cross-sectional shape of the cage, the upper side portion being more porous than the lower side portion.

4. A cage guard, comprising:

a nonporous bottom;

a lower side portion attached to the nonporous bottom;

an upper side portion attached to the lower side portion, the upper side portion being more porous than the lower side portion.

* * * * *

UNITED STATES PATENT AND TRADEMARK OFFICE
CERTIFICATE OF CORRECTION

PATENT NO.    : 6,394,034 B2
DATED         : May 28, 2002
INVENTOR(S)   : Patricia Watts It is certified that error appears in the above-identified patent and that said Letters Patent is hereby corrected as shown below:

<u>Column 6,</u>
Line 47, "approximately" should be changed to -- approximating --

Signed and Sealed this

Twenty-fifth Day of February, 2003

JAMES E. ROGAN
*Director of the United States Patent and Trademark Office*